(12) United States Patent
Chen et al.

(10) Patent No.: US 12,190,487 B2
(45) Date of Patent: Jan. 7, 2025

(54) IMAGE PROCESSING METHOD, APPARATUS, ELECTRONIC DEVICE AND STORAGE MEDIUM

(71) Applicant: BOE TECHNOLOGY GROUP CO., LTD., Beijing (CN)

(72) Inventors: Guannan Chen, Beijing (CN); Mengdi Sun, Beijing (CN); Yan Gao, Beijing (CN); Lijie Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 382 days.

(21) Appl. No.: 17/635,263

(22) PCT Filed: Apr. 30, 2021

(86) PCT No.: PCT/CN2021/091327
§ 371 (c)(1),
(2) Date: Feb. 14, 2022

(87) PCT Pub. No.: WO2022/226963
PCT Pub. Date: Nov. 3, 2022

(65) Prior Publication Data
US 2023/0342892 A1 Oct. 26, 2023

(51) Int. Cl.
*G06T 5/90* (2024.01)
*G06T 5/20* (2006.01)
*G06V 10/74* (2022.01)

(52) U.S. Cl.
CPC .............. *G06T 5/90* (2024.01); *G06T 5/20* (2013.01); *G06V 10/761* (2022.01); *G06T 2207/20081* (2013.01); *G06T 2207/20208* (2013.01)

(58) Field of Classification Search
CPC ... G06T 5/90; G06T 5/20; G06T 2207/20081; G06T 2207/20208; G06V 10/761
See application file for complete search history.

(56) References Cited

U.S. PATENT DOCUMENTS

2010/0329557 A1* 12/2010 Wang ................... G06T 5/92
382/171

* cited by examiner

*Primary Examiner* — Diane D Mizrahi
(74) *Attorney, Agent, or Firm* — Intellectual Valley Law, P.C.

(57) ABSTRACT

An image processing method, an apparatus, an electronic device and a non-transient computer-readable storage medium. The image processing method includes: acquiring an original image; performing a fuzzy processing to the original image to obtain a fuzzy image; performing a high-dynamic-range image to the original image by using a first network model obtained by pre-training, to obtain a first characteristic matrix, wherein the first network model includes a dense residual module and a gate-control-channel conversion module; obtaining an auxiliary characteristic matrix of the original image according to the fuzzy image, wherein the auxiliary characteristic matrix includes detail information of the original image and/or low-frequency information of the original image; obtaining a target image according to the first characteristic matrix and the auxiliary characteristic matrix.

19 Claims, 5 Drawing Sheets

IMAGE PROCESSING METHOD, APPARATUS, ELECTRONIC DEVICE AND STORAGE MEDIUM

TECHNICAL FIELD

The present disclosure relates to the technical field of computer, particularly to an image processing method, an apparatus, an electronic device and a non-transient computer readable storage medium.

BACKGROUND

With the continuous development of computer technology, more and more users use portable electronic equipment to shoot images, and the users' pursuit of image effect is also getting higher and higher. More and more users want to obtain high-dynamic-range (HDR) images.

In the related art, HDR images are generally obtained by shooting a plurality of consecutive images with different degrees of exposure to supplement the information loss of a single frame. However, due to the long shooting time of multi-frame exposure scheme, the lens or objects may move during the shooting process, which may lead to the existence of structural artifacts in the final HDR image.

SUMMARY

According to a first aspect of embodiments of the present disclosure, an image processing method is provided, including:
  acquiring an original image;
  performing a fuzzy processing to the original image to obtain a fuzzy image;
  performing a high-dynamic-range processing to the original image by using a first network model obtained by pre-training, to obtain a first characteristic matrix, wherein the first network model includes a dense residual module and a gate-control-channel conversion module, the dense residual module includes a dense-connection network and a residual network, an input of the residual network includes output results of a plurality of convolutional layers in the dense-connection network; the gate-control-channel conversion module is configured to analyze differences between a plurality of input characteristic channels, and determine a weight of each of the characteristic channels according to analysis results;
  obtaining an auxiliary characteristic matrix of the original image according to the fuzzy image, wherein the auxiliary characteristic matrix includes at least one of the following information: detail information of the original image and low-frequency information of the original image; and
  obtaining a target image according to the first characteristic matrix and the auxiliary characteristic matrix.

In an optional implementation way, the first network model includes the plurality of alternately disposed dense residual modules and gate-control-channel conversion modules.

In an optional implementation way, the auxiliary characteristic matrix includes a second characteristic matrix and a third characteristic matrix, the step of obtaining the auxiliary characteristic matrix of the original image according to the fuzzy image, includes:
  according to the original image, the fuzzy image and a second network model obtained by pre-training, obtaining the second characteristic matrix, wherein the second characteristic matrix includes the detail information of the original image, the second network model includes the dense residual module and the gate-control-channel conversion module;
  inputting the fuzzy image into a third network model obtained by pre-training, to obtain the third characteristic matrix, wherein the third characteristic matrix includes the low-frequency information of the original image, the third network model includes the dense residual module and the gate-control-channel conversion module.

In an optional implementation way, the step of according to the original image, the fuzzy image and the second network model obtained by pre-training, obtaining the second characteristic matrix, includes:
  calculating a first difference value between the original image and the fuzzy image;
  inputting the first difference value into the second network model, to obtain the second characteristic matrix.

In an optional implementation way, the step of obtaining a target image according to the first characteristic matrix and the auxiliary characteristic matrix, includes:
  calculating a first sum value between the first characteristic matrix and the second characteristic matrix;
  calculating a product between the first sum value and the third characteristic matrix, to obtain the target image.

In an optional implementation way, network structures of the first network model, the second network model and the third network model are same.

In an optional implementation way, before the steps of performing a high-dynamic-range processing to the original image by using the first network model obtained by pre-training, and obtaining the auxiliary characteristic matrix of the original image according to the fuzzy image, the method further includes:
  obtaining an original sample image and a target sample image, wherein the original sample image is a low-dynamic-range image, and the target sample image is a high-dynamic-range image corresponding to the original sample image;
  performing the fuzzy processing to the original sample image, to obtain a fuzzy sample image;
  inputting the original sample image into a first to-be-trained network, to obtain a first output result;
  inputting a difference between the original sample image and the fuzzy sample image into a second to-be-trained network, to obtain a second output result;
  inputting the fuzzy sample image into a third to-be-trained network, to obtain a third output result;
  calculating a second sum value of the first output result and the second output result, and multiplying the second sum value to the third characteristic matrix, to obtain a predicted image;
  according to the predicted image and the target sample image, training the first to-be-trained network, the second to-be-trained network and the third to-be-trained network, determining the first to-be-trained network as the first network model, determining the second to-be-trained network as the second network model, and determining the third to-be-trained network as the third network model.

In an optional implementation way, the step of according to the predicted image and the target sample image, training the first to-be-trained network, the second to-be-trained network and the third to-be-trained network, includes:

calculating a second difference value between the predicted image and the target sample image;

calculating a first matching degree between the predicted image and a display screen, and a second matching degree between the target sample image and the display screen;

according to a difference between the first matching degree and the second matching degree, and the second difference value, calculating a loss function;

performing optimization to parameters in the first to-be-trained network, the second to-be-trained network and the third to-be-trained network with a target of minimizing the loss function, to obtain the first network model, the second network model and the third network model.

In an optional implementation way, the step of performing the fuzzy processing to the original image to obtain the fuzzy image, includes:

performing a guided filter processing to the original image, to obtain the fuzzy image.

According to a second aspect of embodiments of the present disclosure, an image processing apparatus is provided, including:

an original image acquisition module, configured for acquiring an original image;

a fuzzy image acquisition module, configured for performing a fuzzy processing to the original image to obtain a fuzzy image;

a first characteristic extraction module, configured for performing a high-dynamic-range processing to the original image by using a first network model obtained by pre-training, to obtain a first characteristic matrix, wherein, the first network model includes a dense residual module and a gate-control-channel conversion module, the dense residual module includes a dense-connection network and a residual network, an input of the residual network includes output results of a plurality of convolutional layers in the dense-connection network; the gate-control-channel module is configured to analyze differences between a plurality of input characteristic channels, and determine a weight of each of the characteristic channels according to analysis results;

an auxiliary characteristic extraction module, configured for obtaining an auxiliary characteristic matrix of the original image according to the fuzzy image, wherein the auxiliary characteristic matrix includes at least one of the following information: detail information of the original image and low-frequency information of the original image;

a target image acquisition module, configured for obtaining a target image according to the first characteristic matrix and the auxiliary characteristic matrix.

In an optional implementation way, the first network model includes the plurality of dense residual modules and gate-control-channel conversion modules which are alternately disposed.

In an optional implementation way, the auxiliary characteristic matrix includes a second characteristic matrix and a third characteristic matrix, the auxiliary characteristic extraction module is specifically configured for:

according to the original image, the fuzzy image and the second network model obtained by pre-training, obtaining the second characteristic matrix, wherein the second characteristic matrix includes the detail information of the original image, the second network model includes the dense residual modules and the gate-control-channel conversion modules;

inputting the fuzzy image into the third network model obtained by pre-training, to obtain the third characteristic matrix, wherein the third characteristic matrix includes low-frequency information of the original image, the third network model includes the dense residual modules and the gate-control-channel conversion modules.

In an optional implementation way, the apparatus further includes: a model-training module, configured for:

obtaining an original sample image and a target sample image, wherein the original sample image is a low-dynamic-rage image, and the target sample image is a high-dynamic-range image corresponding to the original sample image;

performing the fuzzy processing to the original sample image, to obtain a fuzzy sample image;

inputting the original sample image into a first to-be-trained network, to obtain a first output result;

inputting a difference between the original sample image and the fuzzy sample image into a second to-be-trained network, to obtain a second output result;

inputting the fuzzy sample image into a third to-be-trained network, to obtain a third output result;

calculating a second sum value of the first output result and the second output result, and multiplying the second sum value to the third characteristic matrix, to obtain a predicted image;

according to the predicted image and the target sample image, training the first to-be-trained network, the second to-be-trained network and the third to-be-trained network, determining the first to-be-trained network as the first network model, determining the second to-be-trained network as the second network model, and determining the third to-be-trained network as the third network model.

According to a third aspect of the present disclosure, an electronic device is provided, the electronic device including:

a processor;

a memory for storing executable instructions of the processor;

wherein, the processor is configured for implementing the executable instructions, to implement the image processing method described in the first aspect.

According to a fourth aspect of the present disclosure, a non-transient computer-readable storage medium is provided, when instructions in the non-transient computer-readable storage medium executed by the processor of the electronic device, to make the electronic device is capable to execute the image processing method described in the first aspect.

The above description is only an overview of the technical scheme of the disclosure. In order to better understand the technical means of the disclosure, the implementation can be carried out in accordance with the contents of the manual, and in order to make the aforesaid and other purposes, features and advantages of the disclosure more obvious and understandable, the specific implementation methods of the disclosure are given below.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are embodiments of the present disclosure, and a person skilled in the art can obtain other figures according to these figures without paying creative work. It should be noted that the ratios in the drawings are merely illustrative and do not represent actual ratios.

DETAILED DESCRIPTION OF THE EMBODIMENTS

In order to make the objects, the technical solutions, and the advantages of the embodiments of the present disclosure clearer, the embodiments of the present disclosure will be clearly and completely described below with reference to the drawings of the embodiments of the present disclosure. Apparently, the described embodiments are merely certain embodiments of the present disclosure, rather than all the embodiments. All the other embodiments that a person skilled in the art obtains based on the embodiments of the present disclosure without paying creative work fall within the protection scope of the present disclosure.

Figure 1:
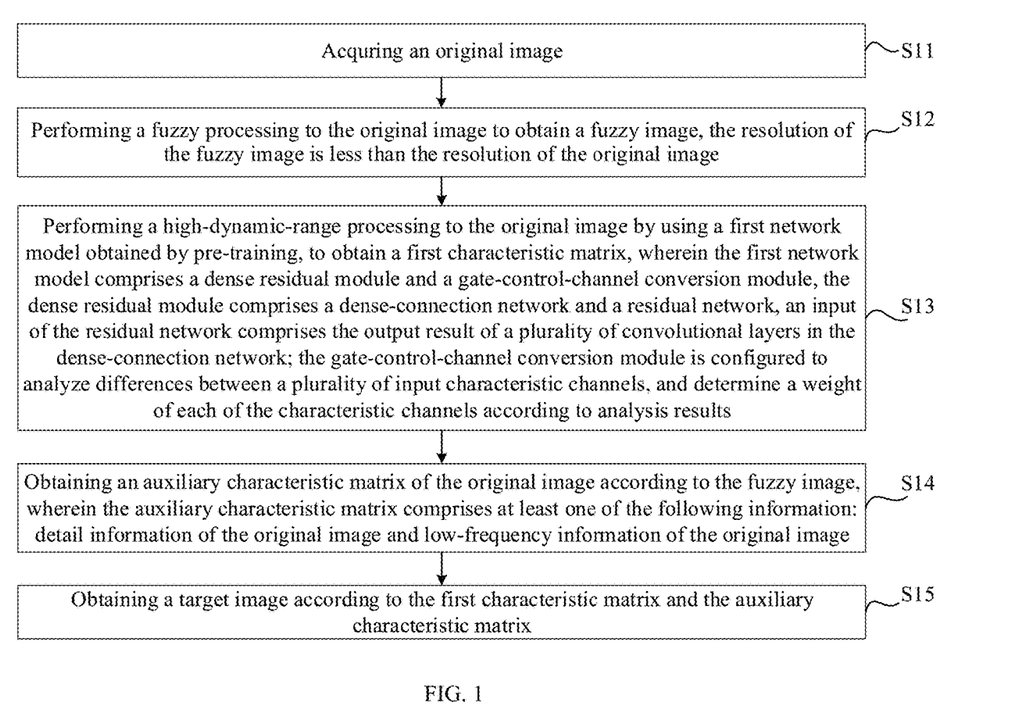
FIG. 1 illustrates a flow chart of an image processing method according to a schematic embodiment.

FIG. 1 is a flow chart of an image processing method according to a schematic embodiment, and the image processing method may be applied to electronic devices such as a terminal or a sever. As referred to FIG. 1, the image processing method includes the following steps.

In step S11, acquiring an original image.

Wherein, the original image may be a preview image on the shooting interface of an image acquisition apparatus in an electronic device, such as a preview image displayed on the shooting interface of a smart phone. It may also be an image taken by any electronic devices, or an image downloaded from the Internet, etc. The specific method of obtaining the original image is not limited in the present disclosure.

In this embodiment, the original image may be a low-dynamic-range image. The low-dynamic-range image generally means that gray-scale value range of a digital image is not enough to express detail information of real images.

In step S12, performing a fuzzy processing to the original image to obtain a fuzzy image.

Wherein, the resolution or the image size of the fuzzy image may be same as that of the original image. The definition of the fuzzy image is less than that of the original image.

In an optional implementation way, it may perform a guided filter processing to the original image, to obtain the fuzzy image.

In this implementation way, it may take the original image as a guided image, and perform filter processing to the original image to obtain the fuzzy image. In practical applications, it may use ways such as bilateral filter and least squares filter and so forth to perform filter processing to the original image, so that the fuzzy image may be obtained. The specific acquisition method of the fuzzy image is not limited in this embodiment.

In step S13, performing high-dynamic-range processing to the original image by using a first network model obtained by pre-training, to obtain a first characteristic matrix, wherein the first network model includes a dense residual module and a gate-control-channel conversion module, the dense residual module includes a dense-connection network and a residual network, an input of the residual network includes output results of a plurality of convolutional layers in the dense-connection network; the gate-control-channel module is configured to analyze differences between a plurality input characteristic channels, and determine a weight of each of the characteristic channels according to analysis results.

In step S14, obtaining an auxiliary characteristic matrix of the original image according to the fuzzy image, wherein the auxiliary characteristic matrix includes at least one of the following information: detail information of the original image and low-frequency information of the original image.

In step S15, obtaining a target image according to the first characteristic matrix and the auxiliary characteristic matrix.

In this embodiment, the target image is a high-dynamic-range image. The high-dynamic-range image is an image after processing the low-dynamic-range image, and performing restoration of details of areas of over-exposure, under-exposure and other missing details, it expands the expression range of gray-scale values and improves the visual performance of the image.

Figure 6:
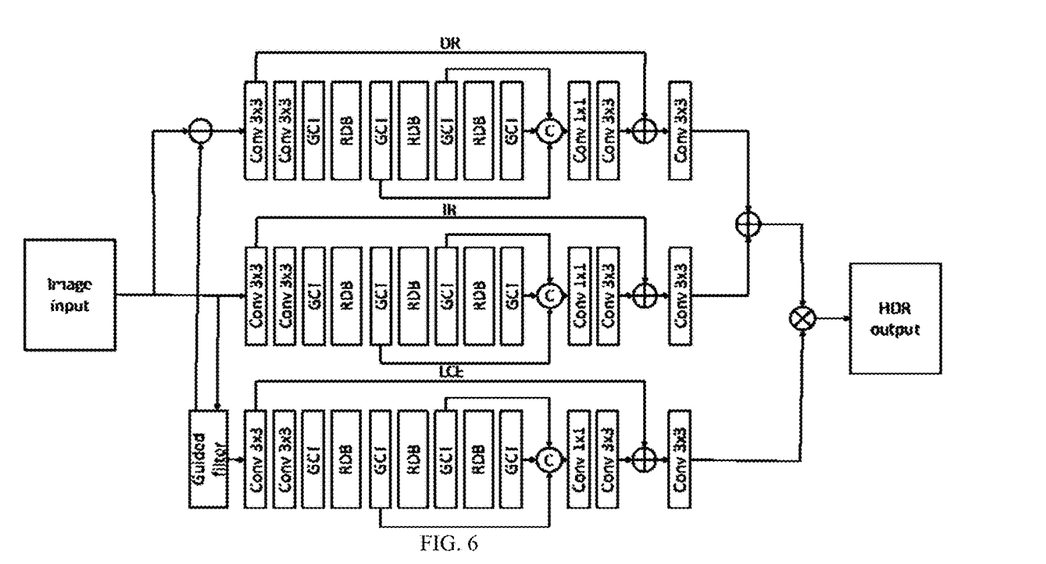
FIG. 6 illustrates structural schematic diagrams of a first network model, a second network model and a third network model according to a schematic embodiment.

Wherein, the first network model is an image reconstruction (IR) module, as referred to FIG. 6, the input is the original image (the image input in FIG. 6), the task of the first network model is based on the original image, performing a rough high-dynamic-range image reconstruction, and outputting a first characteristic matrix.

In this embodiment, the first network model may be obtained by training a deep-neural-network model containing a dense residual module and a gate-control-channel conversion module by using the low-dynamic-range image and its corresponding high-dynamic-range image. The training process of the first network model is introduced in details in subsequent embodiments.

In this embodiment, the dense residual module includes a dense-connection network and a residual network. The input of each convolutional layer in the dense-connection network is the output of all the previous convolutional layers, and the input of the residual network may include the output results of all the convolutional layers in the dense-connection network. The dense residual module may able to fully use the convolutional result of each of the convolutional layers, the characteristic extraction ability is therefore strong.

In specific implementations, the dense residual module may be a residual dense block (RDB), an Unet or a resnet and so forth. This embodiment takes the RDB as an example to explain. The RDB is a network structure that combines a Residual Net and a Dense Net, and the performance is better in the direction of image processing.

Figure 2:
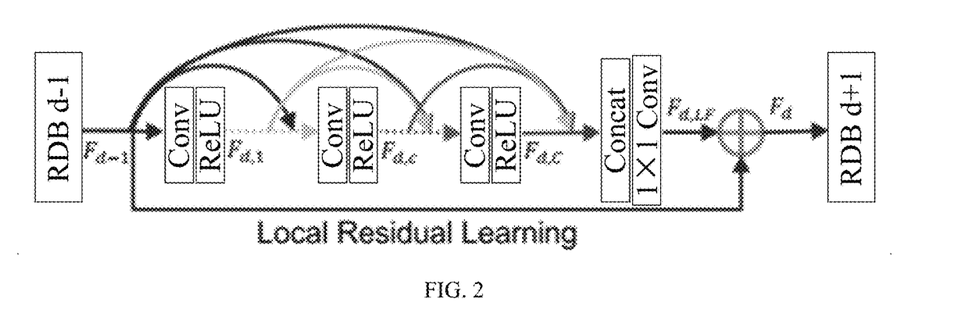
FIG. 2 illustrates a structural schematic diagram of a dense residual module according to a schematic embodiment.

As referred to FIG. 2 which illustrates a schematic diagram of the structure of RDB. The middle layers of the RDB use the dense-connection mode, the last layer uses the residual-hope-connection way to output. This kind of network design may fully ensure that the characteristic information flow in each of the layers, and ensure a relatively fast reasoning speed when the quantity of network parameters is relatively large.

In this embodiment, the gate-control-channel conversion module is used to analyze differences of a plurality of input characteristic channels, obtain the competition and the cooperation relationship between each of the characteristic channels, and then assign a weight for each of the characteristic channels according to the competition and the cooperation relationship between each of the characteristic channels.

In specific implementation, the gate-control-channel conversion module may be a gate channel transformation (GCT), an instanceNorm or a batchNorm and so forth. This embodiment takes the GCT as an example to explain. The GCT may model the semantic information of the neural network more effectively, quickly and accurately. It may analyze the competition and the cooperation relation between channels in each of the layers and control the behavior of each of the characteristic channels with normalization and gating mechanism. Through light-weight calculation, the GCT makes the training process of network more stable, improves the convergence speed of the network, and improves the output performance of network model.

Figure 3:
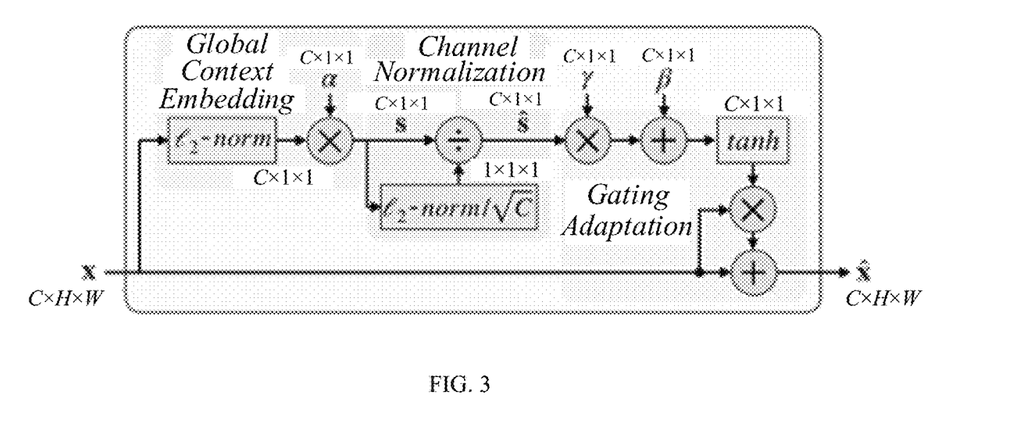
FIG. 3 illustrates a structural schematic diagram of a gate-control-channel conversion module according to a schematic embodiment.

As referred to FIG. 3 which illustrates a schematic diagram for the structure of GCT. The GCT includes three parts which are a global context embedding, a channel normalization and a gating adaptation.

Wherein, the global context embedding part corresponds to the Global Context Embedding in FIG. 3, and is configured to analyze the global context information, compensates the local context information ambiguity caused by small convolutional kernels. The formula for the global context embedding part is as following:

$$s_c = \alpha_c \|x_c\|_2 = \alpha_c \left\{ \left[ \sum_{i=1}^{H} \sum_{j=1}^{W} (x_c^{i,j})^2 \right] + \epsilon \right\}^{\frac{1}{2}}$$

Wherein, $x_c$ is the $c^{th}$ input characteristic channel, that is, a characteristic graph matrix output by the convolutional layers; $S_c$ is the $c^{th}$ characteristic channel output by the module; H and W are the height and the width of the channel, respectively; $\alpha_c$ is a trainable parameter corresponds to the channel which participates in the whole network training; $\epsilon$ is a constant and is 0.00001 in this embodiment.

The channel normalization part, corresponds to the Channel Normalization in FIG. 3, and is configured to build the competition relationship between the channels, the formula of the channel normalization part is as following:

$$\hat{s}_c = \frac{\sqrt{C} s_c}{\|s\|_2} = \frac{\sqrt{C} s_c}{\left[ \left( \sum_{c=1}^{C} s_c^2 \right) + \epsilon \right]^{\frac{1}{2}}}$$

Wherein, $\sqrt{C}$ is a scale parameter, which controls the value range of $\hat{s}_c$; $\epsilon$ is a constant, to avoid the divisor to be 0; s is the set of all channels.

The gating adaptation part, corresponds to the Gating Adaptation in FIG. 3, by using the gating adaptation mechanism, the GCT may form the competition and cooperation relationships between each of the characteristic channels, the formula of the gating adaptation part is as following:

$$\hat{x}_c = x_c [1 + \tan h(\gamma_c \hat{s}_c + \beta_c)]$$

Wherein, $\beta_c$ and $\gamma_c$ are a gating bias and a gating weight, respectively, these two parameters participate in the network training to implement the adaptive adjustment according to channel characteristics.

In this embodiment, by combining the RDB and the GCT, the performance of the RDB is further improved, and the training convergence is faster and the image effect is better. It is verified by experiments that the output on peak signal to noise ratio (PSNR) of the network structure with the GCT may be improved by 0.2 dB compared with that of the original RDB module.

In an optional implementation way, the first network model may include the plurality of alternately disposed dense residual modules and gate-control-channel conversion modules, this embodiment does not limit this.

In practical implementation, the first network model may include the plurality of dense residual modules and the plurality of gate-control-channel conversion modules, the dense residual modules and the gate-control-channel conversion modules are alternately disposed, which may improve the convergence speed and obtain the better image processing effect.

As referred to FIG. 6, the first network model IR includes 3 dense residual modules RBD and 4 gate-control-channel conversion modules GCT. The specific quantities of the dense residual modules and the gate-control-channel conversion modules may be determined by factors such as the effect and the efficiency and so forth, which are not limited in this embodiment.

In step S13, the original image is input into the first network model including the dense residual modules and the gate-control-channel conversion modules, and the first characteristic matrix is output. The first characteristic matrix includes the basic information of the original image.

In step S14, the step of obtaining the auxiliary characteristic matrix of the original image according to the fuzzy image may include: according to the fuzzy image, obtaining a second characteristic matrix reflecting the detail information of the original image; or, according to the fuzzy image, obtaining a third characteristic matrix reflecting the low-frequency information of the original image; or, according to the fuzzy image, obtaining a second characteristic matrix and a third characteristic matrix.

Wherein, the auxiliary characteristic matrix may include the second characteristic matrix, or include the third characteristic matrix, or include the second characteristic matrix and the third characteristic matrix, the auxiliary characteristic matrix is not limited in this embodiment. The subsequent embodiments may specifically introduce the process of obtaining the second characteristic matrix and the third characteristic matrix according to the fuzzy image.

When the auxiliary characteristic matrix includes the second characteristic matrix, in step S15, the step of obtaining the target image according to the first characteristic matrix and the auxiliary characteristic matrix may include: summing the first characteristic matrix and the second characteristic matrix to obtain the target image.

When the auxiliary characteristic matrix includes the third characteristic matrix, in step S15, the step of obtaining the target image according to the first characteristic matrix and the auxiliary characteristic matrix may include: multiplying the first characteristic matrix and the third characteristic matrix to obtain the target image.

When the auxiliary characteristic matrix includes the second characteristic matrix and the third characteristic matrix, in step S15, the step of obtaining the target image according to the first characteristic matrix and the auxiliary characteristic matrix may include: first calculating a first sum value of the first characteristic matrix and the second characteristic matrix; and then calculating a product of the first sum value and the third characteristic matrix, and obtaining the target image.

When the auxiliary characteristic matrix includes the second characteristic matrix and the third characteristic matrix, it may obtain the target image with more image details and dynamic ranges. As referred to FIG. 4 and FIG. 5, which illustrate a group of comparison diagrams of original image and target image, respectively.

Figure 4:
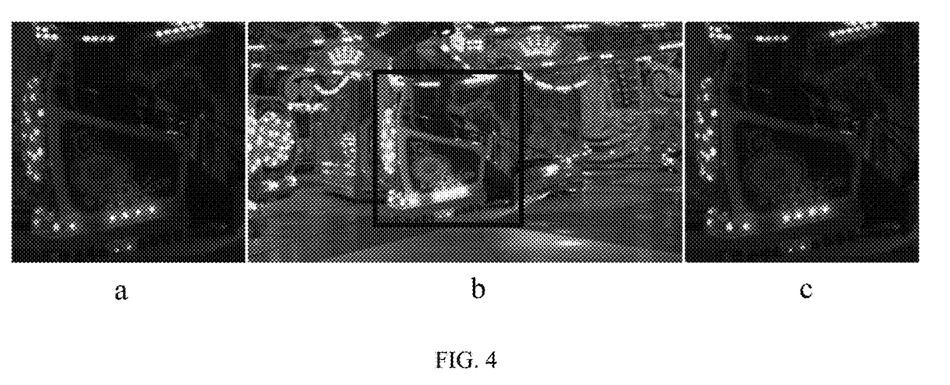
FIG. 4 illustrates a group of original images and target images according to a schematic embodiment.
Figure 5:
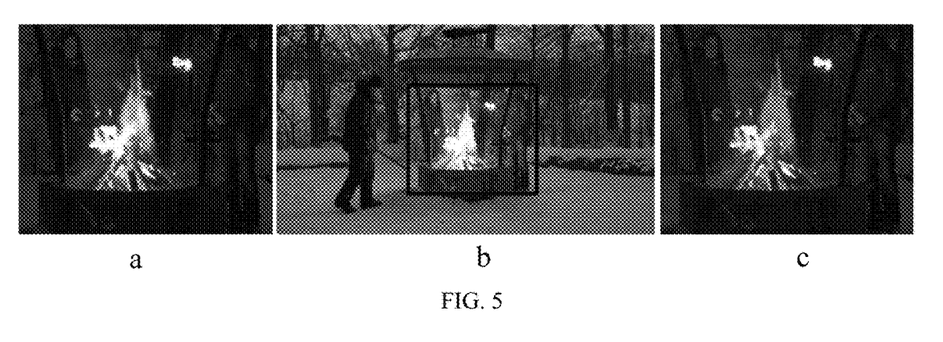
FIG. 5 illustrates another group of original images and target images according to a schematic embodiment.

Wherein, in FIG. 4, b is the original image, c is the target image corresponding to the black box position in the original image, the PSNR and the mu-PSNR of the target image are 42.01 dB and 36.72 dB, respectively. As comparison, in FIG. 4, a is the real high-dynamic-range image corresponding to the black box position in the original image. In FIG. 5, b is the original image, c is the target image corresponding to the black box position in the original image, the PSNR and the mu-PSNR of the target image are 41.02 dB and 32.15 dB, respectively. As comparison, in FIG. 5, a is the real high-dynamic-range image corresponding to the black box position in the original image. It may be discovered by comparison, by using the technical solution provided in this embodiment, the target image obtained is able to present more details of the darker and the brighter parts of the scene, so that the definition of the image is higher, the sense of hierarchy is stronger, and it is able to show real feelings that are closer to human vision.

In the image processing method provided in this schematic embodiment, the high-dynamic-range target image may be obtained by processing the single-flame-exposure image which is the original image. In addition, due to the first network model combines the dense residual modules and the gate-control-channel conversion modules, the speed of image processing may be improved, the processing effect is optimized, and the peak signal to noise ratio of the target image is improved.

In an optional implementation way, the auxiliary characteristic matrix may include the second characteristic matrix and the third characteristic matrix, the step S14 may specifically include:

according to the original image, the fuzzy image and the second network model obtained by pre-training, obtaining the second characteristic matrix, wherein the second characteristic matrix include the detail information of the original image, the second network model includes the dense residual modules and the gate-control-channel conversion modules; and inputting the fuzzy image into the third network model obtained by pre-training, to obtain the third characteristic matrix, wherein the third characteristic matrix includes the low-frequency information of the original image, the third network model includes the dense residual modules and the gate-control-channel conversion modules.

Wherein, the step of according to the original image, the fuzzy image and the second network model obtained by pre-training, obtaining the second characteristic matrix, further may include: calculating a first difference value between the original image and the fuzzy image; and inputting the first difference value into the second network model, to obtain the second characteristic matrix; or, calculating an ratio value between the original image and the fuzzy image; and inputting the ratio value into the second network model, to obtain the second characteristic matrix.

As referred to FIG. 6, which illustrates a schematic diagram of the network structures of the first network model, the second network model and the third network model. Three network modules all integrate the dense residual modules and the gate-control-channel conversion modules, the three network modules all take the combination of the RDB and the GCT as the backbone network. Finally, a task-specific network based on channel adaptive residual dense network (TCRDN) is formed.

The input of the first network model IR is the original image, that is the Image input in FIG. 6.

The second network model is a detail restoration (DR) module, the input is the difference value (as shown in FIG. 6) or the ratio value between the original image and the fuzzy image, the task is to restore and fine-adjust the detail information of the image, and output the second characteristic matrix reflecting the detail information of the image. As referred to FIG. 6, the fuzzy image may be obtained through performing guided filter processing to the original image.

The third network model is a local contrast enhancement (LCE) model, inputting the fuzzy image obtained by guided filter processing, the task is to lean the low-frequency information in the image and output the third characteristic matrix reflecting the low-frequency information. Wherein, the low-frequency information may be such as low-frequency brightness and color distribution information. Each element in the third characteristic matrix may be the brightness and a color compensation coefficient of each pixel.

In an optional implementation way, the network structures of the first network model IR, the second network model IDR and the third network model LCE may be the same.

This implementation way has the advantages of simple structure, easy deployment and training, and may achieve better high-dynamic range enhanced image performance. It should be noted that the model parameters of the first network model, the second network model and the third network model may be different.

As referred to FIG. 6, the first network model IR, the second network model IDR and the third network model LCE are all formed by connection in sequence of ordinary convolutional layers, the alternately disposed 4 gate-control-channel conversion modules GCT and 3 dense residual modules, and ordinary convolutional layers, so that the model convergence speed may be improved to obtain a better image processing effect.

In FIG. 6, Conv 3*3 represents the ordinary convolutional layers with a convolutional kernel size of 3*3. Conv 1*1 represents the ordinary convolutional layers with a convolutional kernel size of 1*1. C stands for Concat.

In practical implementations, the first network model, the second network model and the third network model may be obtained by training the deep-neural-network model including the dense residual modules and the gate-control-channel conversion modules at the same time by using the low-dynamic-range image and its corresponding high-dynamic-range image.

In an optional implementation way, before the step of performing a high-dynamic-range processing to the original image by using the first network model obtained by pre-training, and the step of obtaining the auxiliary characteristic matrix of the original image according to the fuzzy image, it may further include: steps of model-training, the steps of the model-training may specifically include:

obtaining an original sample image and a target sample image, wherein the original sample image is the low-dynamic-range image, and the target sample image is the high-dynamic-range image corresponding to the original sample image;

performing the fuzzy processing to the original sample image, to obtain the fuzzy sample image;

inputting the original sample image into the first to-be-trained network, to obtain the first output result;

inputting the difference between the original sample image and the fuzzy sample image into the second to-be-trained network, to obtain the second output result;

inputting the fuzzy sample image into the third to-be-trained network, to obtain the third output result;

calculating the second sum value between the first output result and the second output result, and multiplying the second sum value to the third characteristic matrix, to obtain the predicted image; and according to the predicted image and the target sample image, training the first to-be-trained network, the second to-be-trained network and the third to-be-trained network, determining the first to-be-trained network as the first network model, determining the second to-be-trained network as the second network model, and determining the third to-be-trained network as the third network model.

In this implementation way, the network structures of the first to-be-trained network, the second to-be-trained network and the third to-be-trained network may be the same, such as ordinary convolutional layers, the RDB and the GCT may be included, as referred to FIG. 6.

In this implementation way, the original sample image may be the low-dynamic-range image itself or it may be an original sample image block with a size of 256*256 randomly selected in some one position in the low-dynamic-range image. Correspondingly, the target sample image may be the high-dynamic-range image itself which corresponds to the low-dynamic-range image, or it may be a target sample image block corresponding to the position and the size of the original sample image block in the high-dynamic-range image.

In an optional implementation way, according to the predicted image and the target sample image, the training steps of the first-to-be-trained network, the second to-be-trained network and the third to-be-trained network may specifically include:

calculating the second difference value between the predicted image and the target sample image;

calculating the first matching degree between the predicted image and the display screen, and the second matching degree between the target sample image and the display screen;

according to the difference between the first matching degree and the second matching degree, and the second difference value, calculating a loss function;

it may through a back propagation algorithm and take minimizing the loss function as a target, performing optimization to the parameters in the first to-be-trained network, the second to-be-trained network and the third to-be-trained network, to obtain the first network model, the second network model and the third network model.

In the training process, the original sample image may be used as the input image and the target sample image may be used as a true-value image. First, according to the original sample image to obtain the fuzzy sample image, and then inputting the original sample image into the first to-be-trained network to obtain the first output result; inputting the difference between the original sample image and the fuzzy sample image into the second to-be-trained network to obtain the second output result; inputting the fuzzy sample image into the third to-be-trained network to obtain the third output result; calculating the second sum value between the first output result and the second output result, and multiplying the second sum value to the third characteristic matrix to obtain the predicted image. After that, it may according to the predicted image and the true-value image to calculate the loss function, the loss function may be the sum of L1 loss and tone mapping loss, and the formula is as following:

$$\text{Loss} = \left\|\hat{I} - I_{gt}\right\|_1 + 0.1 * \left\|\log \frac{(1 + 5000 * \hat{I})}{5001} - \log \frac{(1 + 5000 * I_{gt})}{5001}\right\|_2$$

Wherein the first term of the addition formula is the L1 loss, the second term is the tone mapping loss. $\hat{I}$ is the predicted image, $I_{gt}$ is the target sample image.

$$\log \frac{(1 + 5000 * \hat{I})}{5001}$$

is the first matching degree and $$\log \frac{(1 + 5000 * I_{gt})}{5001}$$

is the second matching degree.

It should be noted that the tone mapping loss item is not necessary, by adding the tone mapping loss item, it may ensure a better display effect obtained by the model processing. In addition, the first matching degree and the second matching degree in the loss function formula are designed based on the display screen on the camera. For other display screens, the formula may be adjusted according to practical situations.

In specific implementations, it may use Adam optimizer to perform optimize-training to the parameters in the first to-be-trained network, the second to-be-trained network and the third to-be-trained network at the same time, and the first network model, the second network model and the third network model may be obtained eventually. The learning rate of the network model may be set to 0.0001, and the specific value may be adjusted according to practical situations.

The network model obtained by training of the method provided by this implementation way, and wins the first prize of the PSNR and the third prize of the mu-PSNR in the NTIRE 2021 International HDR Image Processing Competition.

Figure 7:
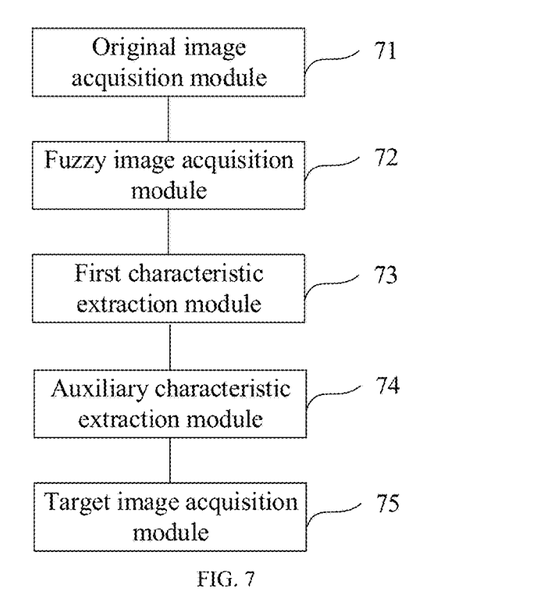
FIG. 7 illustrates a block diagram of an image processing apparatus according to a schematic embodiment.

FIG. 7 is a block diagram of an image processing apparatus according to a schematic embodiment. The image processing apparatus may be applied to electronic devices such as a terminal device or a server. As referred to FIG. 7, the apparatus includes:

an original image acquisition module 71, which is configured for acquiring an original image;

a fuzzy image acquisition module 72, which is configured for performing a fuzzy processing to the original image to obtain the fuzzy image;

a first characteristic extraction module 73, which is configured for performing a high-dynamic-range processing to the original image by using a first network model obtained by pre-training, to obtain a first characteristic matrix, wherein the first network model includes a dense residual module and a gate-control-channel conversion module, the dense residual module includes a dense-connection network and a residual network, the input of the residual network includes output results of a plurality of convolutional layers in the dense-connection network; the gate-control-channel conversion module is configured to analyze differences between a plurality of input characteristic channels, and determine a weight of each of the characteristic channels according to analysis results.

an auxiliary characteristic extraction module 74, which is configured for obtaining an auxiliary characteristic matrix of the original image according to the fuzzy image, wherein the auxiliary characteristic matrix includes at least one of the following information; detail information of the original image and low-frequency information of the original image;

a target image acquisition module 75, which is configured for obtaining a target image according to the first characteristic matrix and the auxiliary characteristic matrix.

Wherein, the original image may be a preview image on the shooting interface of an image acquisition apparatus in an electronic device, such as a preview image displayed on the shooting interface of a smart phone. It may also be an image taken by any electronic devices, or an image downloaded from the Internet, etc. The specific method of obtaining the original image by the original image acquisition module 71 is not limited in the present disclosure.

In this embodiment, the original image may be a low-dynamic-range image. A low-dynamic-range image generally means that the gray-scale value range of a digital image is not enough to express detail information of real images.

Wherein, the resolution or image size of the fuzzy image may be same as the original image. The definition of the fuzzy image is less than that of the original image.

In an optional implementation way, the fuzzy image acquisition module 72 may perform a guided filter processing to the original image to obtain the fuzzy image.

In this implementation way, the fuzzy image acquisition module 72 may take the original image as a guided image, and perform the filter processing to the original image to obtain the fuzzy image. In practical applications, the fuzzy image acquisition module 72 may use ways such as bilateral filter and least squares filter and so forth to perform the filter processing to the original image, so that the fuzzy image may be obtained. The specific way of the fuzzy image acquisition 72 acquiring the fuzzy image is not limited in this embodiment.

In this embodiment, the target image is a high-dynamic-range image. The high-dynamic-range image is an image after processing the low-dynamic-range image, and performing restoration of details of areas of over-exposure, under-exposure and other missing details, it expands the expression range of gray-scale values and improves the visual performance of the image.

Wherein, the first network model is an image reconstruction (IR) module, as referred to FIG. 6, the input is the original image (the image input in FIG. 6), the task of the first network model is based on the original image, performing a rough high-dynamic-range image reconstruction, and outputting a first characteristic matrix.

In this embodiment, the first network model may be obtained by training a deep-neural-network model containing a dense residual module and a gate-control-channel conversion module by using the low-dynamic-range image and its corresponding high-dynamic-range image. The training process of the first network model is introduced in details in subsequent embodiments.

In this embodiment, the dense residual module includes a dense-connection network and a residual network. The input of each convolutional layer in the dense-connection network is the output of all the previous convolutional layers, and the input of the residual network may include the output results of all the convolutional layers in the dense-connection network. The dense residual module may able to fully use the convolutional result of each of the convolutional layers, the characteristic extraction ability is therefore strong.

In specific implementations, the dense residual module may be a residual dense block (RDB), an Unet or a resnet and so forth. This embodiment takes the RDB as an example to explain. The RDB is a network structure that combines a Residual Net and a Dense Net, and the performance is better in the direction of image processing.

As referred to FIG. 2 which illustrates a schematic diagram of the structure of RDB. The middle layers of the RDB use the dense-connection mode, the last layer uses the residual-hope-connection way to output. This kind of network design may fully ensure that the characteristic information flow in each of the layers, and ensure a relatively fast reasoning speed when the quantity of network parameters is relatively large.

In this embodiment, the gate-control-channel conversion module is used to analyze differences of a plurality of input characteristic channels, obtain the competition and the cooperation relationship between each of the characteristic channels, and then assign a weight for each of the characteristic channels according to the competition and the cooperation relationship between each of the characteristic channels.

In specific implementation, the gate-control-channel conversion module may be a gate channel transformation (GCT), an instanceNorm or a batchNorm and so forth. This embodiment takes the GCT as an example to explain. The GCT may model the semantic information of the neural network more effectively, quickly and accurately. It may analyze the competition relation and the cooperation between channels in each of the layers and control the behavior of each of the characteristic channels with normalization and gating mechanism. Through light-weight calculation, the GCT makes the training process of network more stable, improves the convergence speed of the network, and improves the output performance of network model.

As referred to FIG. 3 which illustrates a schematic diagram for the structure of GCT. The GCT includes three parts which are a global context embedding, a channel normalization and a gating adaptation.

Wherein, the global context embedding part corresponds to the Global Context Embedding in FIG. 3, and is configured to analyze the global context information, compensates the local context information ambiguity caused by small convolutional kernels. The formula for the global context embedding part is as following:

$$s_c = \alpha_c \|x_c\|_2 = \alpha_c \left\{ \left[ \sum_{i=1}^{H} \sum_{j=1}^{W} \left( x_c^{i,j} \right)^2 \right] + \epsilon \right\}^{\frac{1}{2}}$$

Wherein, $x_c$ is the $c^{th}$ input characteristic channel, that is, a characteristic graph matrix output by the convolutional layers; $S_c$ is the $c^{th}$ characteristic channel output by the module; H and W are the height and the width of the channel, respectively; $\alpha_c$ is a trainable parameter corresponds to the channel which participates in the whole network training; $\varepsilon$ is a constant and is 0.00001 in this embodiment.

The channel normalization part, corresponds to the Channel Normalization in FIG. 3, and is configured to build the competition relationship between the channels, the formula of the channel normalization part is as following:

$$\hat{s}_c = \frac{\sqrt{C}\, s_c}{\|s\|_2} = \frac{\sqrt{C}\, s_c}{\left[\left(\sum_{c=1}^{C} s_c^2\right) + \epsilon\right]^{\frac{1}{2}}}$$

Wherein, $\sqrt{C}$ is a scale parameter, which controls the value range of $\hat{s}_c$; $\varepsilon$ is a constant, to avoid the divisor to be 0; s is the set of all channels.

The gating adaptation part, corresponds to the Gating Adaptation in FIG. 3, by using the gating adaptation mechanism, so that the GCT may form the competition and cooperation relationships between each of the characteristic channels, the formula of the gating adaptation part is as following:

$\hat{x}_c = x_c[1 + \tan h(\gamma_c \hat{s}_c + \beta_c)]$

Wherein, $\beta_c$ and $\gamma_c$ are a gating bias and a gating weight, respectively, these two parameters participate in the network training to implement the adaptive adjustment according to channel characteristics.

In this embodiment, by combining the RDB and the GCT, the performance of the RDB is further improved, and the training convergence is faster and the image effect is better. It is verified by experiments that the output on peak signal to noise ratio (PSNR) of the network structure with the GCT may be improved by 0.2 dB compared with that of the original RDB module.

In an optional implementation way, the first network model may include the plurality of alternately disposed dense residual modules and gate-control-channel conversion modules, this embodiment does not limit this.

In practical implementation, the first network model may include the plurality of dense residual modules and the plurality of gate-control-channel conversion modules, the dense residual modules and the gate-control-channel conversion modules are alternately disposed, which may improve the convergence speed and obtain the better image processing effect.

As referred to FIG. 6, the first network model IR includes 3 dense residual modules RBD and 4 gate-control-channel conversion modules GCT. The specific quantities of the dense residual modules and the gate-control-channel conversion modules may be determined by factors such as the effect and the efficiency and so forth, which are not limited in this embodiment.

The first characteristic extraction module 73 inputs the original image into the first network model including the dense residual modules and the gate-control-channel conversion modules, and the first characteristic matrix is output. The first characteristic matrix includes the basic information of the original image.

In specific implementations, the auxiliary characteristic extraction module 74 may be specifically configured as: according to the fuzzy image, obtaining a second characteristic matrix reflecting the detail informations of the original image; or, according to the fuzzy image, obtaining a third characteristic matrix reflecting the low-frequency information of the original image; or, according to the fuzzy image, obtaining a second characteristic matrix and a third characteristic matrix.

Wherein, the auxiliary characteristic matrix may include the second characteristic matrix, or include the third characteristic matrix, or include the second characteristic matrix and the third characteristic matrix, the auxiliary characteristic matrix is not limited in this embodiment. The subsequent embodiments may specifically introduce the process of obtaining the second characteristic matrix and the third characteristic matrix by the auxiliary characteristic extraction module 74 according to the fuzzy image.

When the auxiliary characteristic matrix includes the second characteristic matrix, the target image acquisition module 75 may be specifically configured as: summing up the first characteristic matrix and the second characteristic matrix to obtain the target image.

When the auxiliary characteristic matrix includes the third characteristic matrix, the target image acquisition extraction module 75 may be specifically configured as: multiplying the first characteristic matrix and the third characteristic matrix to obtain the target image.

When the auxiliary characteristic matrix includes the second characteristic matrix and the third characteristic matrix, the target image acquisition extraction module 75 may be specifically configured as: first calculating a first sum value of the first characteristic matrix and the second characteristic matrix; and then calculating a product of the first sum value and the third characteristic matrix, and obtaining the target image.

When the auxiliary characteristic matrix includes the second characteristic matrix and the third characteristic matrix, it may obtain the target image with more image details and dynamic ranges. As referred to FIG. 4 and FIG. 5, which illustrate a group of comparison diagrams of original image and target image, respectively.

Wherein, in FIG. 4, b is the original image, c is the target image corresponding to the black box position in the original image, the PSNR and the mu-PSNR of the target image are 42.01 dB and 36.72 dB, respectively. As comparison, in FIG. 4, a is the real high-dynamic-range image corresponding to the black box position in the original image. In FIG. 5, b is the original image, c is the target image corresponding to the black box position in the original image, the PSNR and the mu-PSNR of the target image are 41.02 dB and 32.15 dB, respectively. As comparison, in FIG. 5, a is the real high-dynamic-range image corresponding to the black box position in the original image. It may be discovered by comparison, by using the technical solution provided in this embodiment, the target image obtained is able to present more details of the darker and the brighter parts of the scene, so that the definition of the image is higher, the sense of hierarchy is stronger, and it is able to show real feelings that are closer to human vision.

The image processing apparatus provided in this schematic embodiment, the high-dynamic-range target image may be obtained by processing the single-frame-exposure image which is the original image. In addition, due to the first network model combines the dense residual modules and the gate-control-channel conversion modules, the speed of image processing may be improved, the processing effect is optimized, and the peak signal to noise ratio of the target image is improved.

In an optional implementation way, the auxiliary characteristic matrix may include the second characteristic matrix and the third characteristic matrix, the auxiliary characteristic extraction module is specifically configured as:

according to the original image, the fuzzy image and the second network model obtained by pre-training, obtaining the second characteristic matrix, wherein the second characteristic matrix include the detail information of the original image, the second network model includes the dense residual modules and the gate-control-channel conversion modules; and inputting the fuzzy image into the third network model obtained by pre-training, to obtain the third characteristic matrix, wherein the third characteristic matrix includes the low-frequency information of the original image, the third network model includes the dense residual modules and the gate-control-channel conversion modules.

In an optional implementation way, the auxiliary characteristic extraction module is specifically configured as:

calculating a first difference value between the original image and the fuzzy image; and inputting the first difference value into the second network model, to obtain the second characteristic matrix.

As referred to FIG. 6, which illustrates a schematic diagram of the network structures of the first network model, the second network model and the third network model. Three network modules all integrate the dense residual modules and the gate-control-channel conversion modules, the three network modules all take the combination of the RDB and the GCT as the backbone network. Finally, a task-specific network based on channel adaptive residual dense network (TCRDN) is formed.

The input of the first network model IR is the original image, that is the Image input in FIG. 6.

The second network model is a detail restoration (DR) module, the input is the difference value (as shown in FIG. 6) or the ratio value between the original image and the fuzzy image, the task is to restore and fine-adjust the detail information of the image, and output the second characteristic matrix reflecting the detail information of the image. As referred to FIG. 6, the fuzzy image may be obtained through performing guided filter processing to the original image.

The third network model is a local contrast enhancement (LCE) model, inputting the fuzzy image obtained by guided filter processing, the task is to lean the low-frequency information in the image and output the third characteristic matrix reflecting the low-frequency information. Wherein, the low-frequency information may be such as low-frequency brightness and color distribution information. Each element in the third characteristic matrix may be the brightness and the color compensation coefficient of each pixel.

In an optional implementation way, the network structures of the first network model IR, the second network model IDR and the third network model LCE may be the same.

This implementation way has the advantages of simple structure, easy deployment and training, and may achieve better high-dynamic range enhanced image performance. It should be noted that the model parameters of the first network model, the second network model and the third network model may be different.

As referred to FIG. 6, the first network model IR, the second network model IDR and the third network model LCE are all formed by connection in sequence of ordinary convolutional layers, the alternately disposed 4 gate-control-channel conversion modules GCT and 3 dense residual modules, and ordinary convolutional layers, so that the model convergence speed may be improved to obtain a better image processing effect.

In FIG. 6, Conv 3*3 represents the ordinary convolutional layers with a convolutional kernel size of 3*3. Conv 1*1 represents the ordinary convolutional layers with a convolutional kernel size of 1*1. C stands for Concat.

In practical implementations, the first network model, the second network model and the third network model may be obtained by training the deep-neural-network model including the dense residual modules and the gate-control-channel conversion modules at the same time by using the low-dynamic-range image and its corresponding high-dynamic-range image, to.

In an optional implementation, the image processing apparatus further includes: a model-training module, and which is configured as:

obtaining the original sample image and the target sample image, wherein the original sample image is the low-dynamic-range image and the target sample image is the high-dynamic-range image corresponding to the original sample image;

performing the fuzzy processing to the original sample image, to obtain a fuzzy sample image;

inputting the original sample image into a first to-be-trained network, obtaining a first output result;

inputting a difference between the original sample image and the fuzzy sample image into a second to-be-trained network, to obtain a second output result;

inputting the fuzzy sample image into a third to-be-trained network, to obtain a third output result;

calculating a second sum value of the first output result and the second output result, and multiplying the second sum value to the third characteristic matrix, to obtain a predicted image;

according to the predicted image and the target sample image, training the first to-be-trained, the second to-be-trained network and the third to-be-trained network, determining the first to-be-trained network as the first network model, determining the second to-be-trained network as the second network model, and determining the third to-be-trained network as the third network model.

In this implementation way, the network structures of the first to-be-trained network, the second to-be-trained network and the third to-be-trained network may be the same, such as ordinary convolutional layers, the RDB and the GCT may be included, as referred to FIG. 6.

In this implementation way, the original sample image may be the low-dynamic-range image itself, or it may be an original sample image block with a size of 256*256 randomly selected in some one position in the low-dynamic-range image. Correspondingly, the target sample image may be the high-dynamic-range image itself which corresponds to the low-dynamic-range image, or it may be a target sample image block corresponding to the position and the size of the original sample image block in the high-dynamic-range image.

In an optional implementation way, the model-training module is specifically configured as:

calculating a second difference value between the predicted image and the target sample image;

calculating a first matching degree between the predicted image and a display screen, and a second matching degree between the target sample image and the display screen;

according to the difference of the first matching degree and the second matching degree, and the second difference value, calculating a loss function;

it may through a back propagation algorithm and take minimizing the loss function as a target, performing optimization to the parameters in the first to-be-trained network, the second to-be-trained network and the third to-be-trained network, to obtain the first network model, the second network model and the third network model.

In the training process, the original sample image may be used as the input image and the target sample image may be used as a true-value image. First, according to the original sample image to obtain the fuzzy sample image, and then inputting the original sample image into the first to-be-trained network to obtain the first output result; inputting the difference between the original sample image and the fuzzy sample image into the second to-be-trained network to obtain the second output result; inputting the fuzzy sample image into the third to-be-trained network to obtain the third output result; calculating the second sum value between the first output result and the second output result, and multiplying the second sum value to the third characteristic matrix to obtain the predicted image. After that, it may according to the predicted image and the true-value image to calculate the loss function, the loss function may be the sun of L1 loss and tone mapping loss, and the formula is as following:

$$\text{Loss} = \left\| \hat{I} - I_{gt} \right\|_1 + 0.1 * \left\| \log \frac{(1 + 5000 * \hat{I})}{5001} - \log \frac{(1 + 5000 * I_{gt})}{5001} \right\|_2$$

Wherein the first term of the addition formula is the L1 loss, the second term is the tone mapping loss. $\hat{I}$ is the predicted image, $I_{gt}$ is the target sample image.

$$\log \frac{(1 + 5000 * \hat{I})}{5001}$$

is the first matching degree and $$\log \frac{(1 + 5000 * I_{gt})}{5001}$$

is the second matching degree.

It should be noted that the tone mapping loss item is not necessary, by adding the tone mapping loss item, it may ensure a better display effect obtained by the model processing. In addition, the first matching degree and the second matching degree in the loss function formula are designed based on the display screen on the camera. For other display screens, the formula may be adjusted according to practical situations.

In specific implementations, it may use Adam optimizer to perform optimize-training to the parameters in the first to-be-trained network, the second to-be-trained network and the third to-be-trained network at the same time, and the first network model, the second network model and the third network model may be obtained eventually. The learning rate of the network model may be set to 0.0001, and the specific value may be adjusted according to practical situations.

The network model obtained by training of the method provided by this implementation way, and wins the first prize of the PSNR and the third prize of the mu-PSNR in the NTIRE 2021 International HDR Image Processing Competition.

As for the apparatus in the above embodiments, wherein the specific way of the operation of each of the modules is described in details in the embodiments of the method, so the specific explanation may not be made here.

Figure 8:
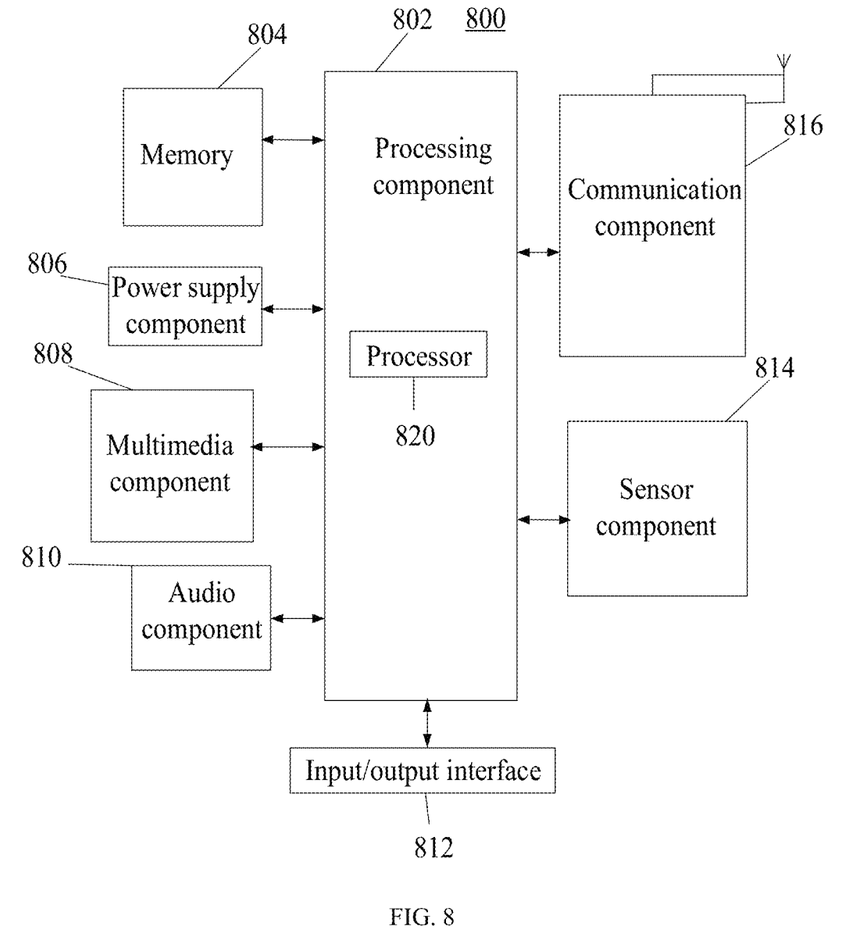
FIG. 8 illustrates a block diagram of an electronic device according to a schematic embodiment.

FIG. 8 is a block diagram of an electronic device 800 shown in the present disclosure. For example, the electronic device 800 may be a mobile phone, a computer, a digital-broadcast terminal, a messaging device, a game console, a tablet device, a medical device, a fitness device, a personal-digital assistant and so forth.

As referred to FIG. 8, the electronic device 800 may include one or more of the following components: a processing component 802, a memory 804, a power supply component 806, a multimedia component 808, an audio component 810, an input/output (I/O) interface 812, a sensor component 814 and a communication component 816.

The processing component 802 generally controls the overall operation of the electronic device 800, such as operations relating to displaying, telephone calling, data communicating, camera operating and recording operations. The processing component 802 may include one or more processors 820 to execute instructions, to complete all or part of the steps of the method described in any of the embodiments. In addition, the processing component 802 may include one or more modules, which is facilitate interactions between the processing component 802 and other components. For example, the processing component 802 may include the multimedia module, which is facilitate interaction between the multimedia component 808 and the processing component 802.

The memory 804 is configured to store various types of data to support operations on the device 800. Examples of these data include instructions for any application or method used to operate on the electronic device 800, contact data, phone book data, messages, pictures, videos, etc. The memory 804 may be any type of transient or non-transient storage device or combinations between them, such as a static random-access memory (SRAM), an erasable programmable read-only memory (EPROM), a programmable read-only memory (PROM), a read-only memory (ROM), a magnetic memory, a flash memory, a disk or cd-rom.

The power supply component 806 provides power to the various components of the electronic device 800. The power supply module 806 may include a power management system, one or more power supplies, and other components associated with generating, managing, and distributing power for the electronic device 800.

The multimedia component 808 includes a screen providing an output interface between the electronic device 800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touching, sliding, and gestures on the touch panel. The touch sensor may not only sense the boundaries of a touching or sliding action, but also detecting the time duration and pressure associated with the touching or sliding operations. In some embodiments, the multimedia component 808 includes a front and/or rear camera. When the device 800 is in an operation mode, such as a shooting or video mode, the front and/or rear camera may receive external multimedia data. Each of the front camera and rear camera may be a fixed optical lens system or having a focal length and optical zoom capabilities.

The audio component 810 is configured to output and/or input audio signals. For example, the audio component 810 includes a microphone (MIC) that is configured to receive external audio signals when the electronic device 800 is in an operational mode such as a calling mode, a recording mode, and a speech-recognizing mode. The received audio signal may be further stored in the memory 804 or sent via the communication module 816. In some embodiments, the audio component 810 also includes a speaker for the output of the audio signal.

The I/O interface 812 provides the interface between the processing module 802 and peripheral interface modules, the peripheral interface modules may be a keyboard, a click wheel, a button and so forth. These buttons may include but are not limited to: a home button, a volume button, a start button and a lock button.

The sensor component 814 includes one or more sensors used to provide various aspects of the status assessment for the electronic device 800. For example, the sensor component 814 may detect the on/off state of the device 800, the relative positioning of the components, such as the components are described as a display screen or a small keyboard in the electronic device 800, the sensor component 814 may also detect the change of positions of the electronic device 800 or one component of the electronic device 800, the contact between the user and the electronic device 800 exists or not, an azimuth or an acceleration/deceleration of the electronic device 800 and temperature change of the electronic device 800. The sensor component 814 may include a proximity sensor which is configured to detect the presence of nearby objects in the absence of any physical contact. The sensor component 814 may also include an optical sensor, such as a CMOS or a CCD image sensor, which applied to imaging applications. In some embodiments, the sensor component 814 may also include an acceleration sensor, a gyroscope sensor, a magnetic sensor, a pressure sensor or a temperature sensor.

The communication module 816 is configured to facilitate communication between the electronic device 800 and other devices by wired or wireless ways. The electronic device 800 may connect to a wireless network based on communication standards, such as a WiFi, a carrier network (such as 2G, 3G, 4G, or 5G), or a combination of them. In a schematic embodiment, the communication component 816 receives broadcast signals or broadcast-related information from an external broadcast management system via a broadcast channel. In a schematic embodiment, the communication component 816 also includes a near-field communication (NFC) module to facilitate short-range communication. For example, the NFC module may be implemented based on a radio-frequency-identification (RFID) technology, an infrared data association (IrDA) technology, an ultra-wideband (UWB) technology, a Bluetooth (BT) technology and other technologies.

In a schematic embodiment, the electronic device 800 may be applied to an application-specific integrated circuit (ASIC), a digital signal processor (DSP), a digital signal processing equipment (DSPD), a programmable logic device (PLD), a field programmable gate array (FPGA), a controller, a microcontroller, a micro-processor and other electronic components, for executing the method described in any of the embodiments.

In a schematic embodiment, a non-transient computer readable storage medium including instructions is also provided, such as the memory 804 including instructions, which may be executed by the processor 820 of the electronic device 800 to complete the method described in any of the embodiments. For example, the non-transient computer readable storage media may be a ROM, a random-access memory (RAM), a CD-ROM, a magnetic tape, a floppy disk, an optical data storage device and so forth.

In a schematic embodiment, a computer program product is also provided, the computer program product includes a readable program code that may be executed by the processor 820 of the device 800 to accomplish the method described in any of the embodiments. Optionally, the program code may be stored in the storage media of the device 800, which may be a ROM, a random-access memory (RAM), a CD-ROM, a magnetic tape, a floppy disk, an optical data storage device and so forth.

Figure 9:
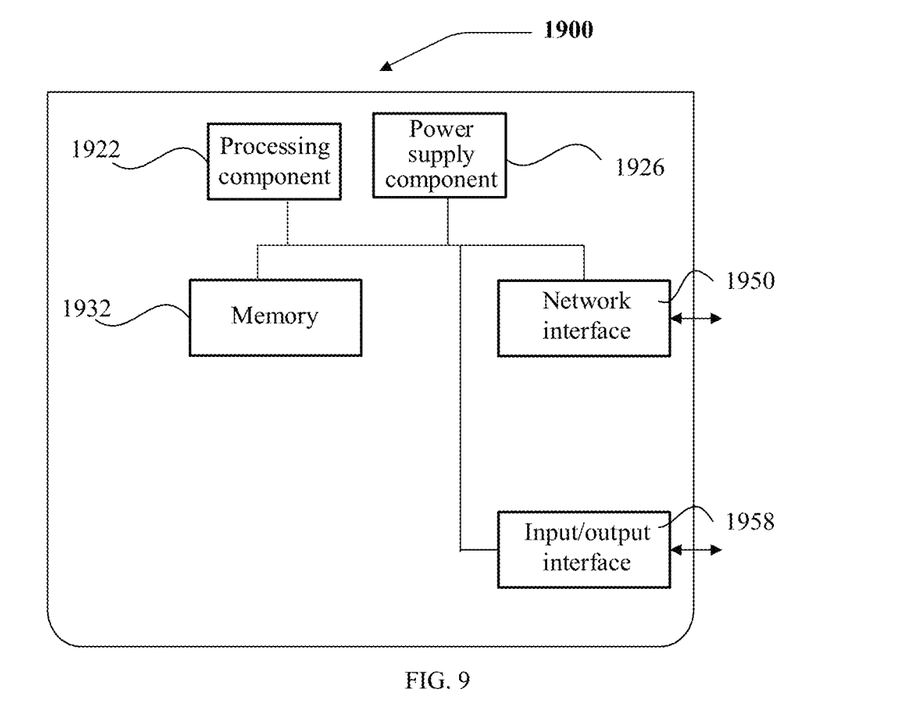
FIG. 9 illustrates a block diagram of another electronic device according to a schematic embodiment.

FIG. 9 is a block diagram of an electronic device 1900 shown in the present disclosure. For example, the electronic device 1900 may be provided as a server.

As referred to FIG. 9, the electronic device 1900 includes the processing component 1922, which further includes a processor, and memory resources represented by the memory 1932 for storing instructions that may be executed by the processing component 1922, such as applications. The applications stored in the memory 1932 may include one or more modules of each corresponding to a group of instructions. In addition, the processing component 1922 is configured to execute instructions to perform the method described in any of the embodiments.

The electronic device 1900 may also include a power supply module 1926, which is configured to perform power management of the electronic device 1900, a wired or wireless network interface 1950 configured to connect the electronic device 1900 to the network, and an input/output (I/O) interface 1958. The electronic device 1900 may operate the operating system stored on the memory 1932, such as a WindowsServer™, a MacOSX™, a Unix™, Linux™, a FreeBSD™ or similar systems.

Other embodiments of this disclosure will be readily available to those skilled in the field after considering the specification and the practice of the invention disclosed herein. This disclosure is intended to cover any variation, use or adaptation of this disclosure that follows the general principles of this disclosure and includes common knowledge or conventional techniques in the field of technology not disclosed in this disclosure. The specifications and embodiments are deemed to be exemplary only and the true scope and spirit of this disclosure is indicated by the following claims.

It should be understood that the present disclosure is not limited to the exact structure described above and shown in the attached drawings, and that various modifications and changes may be made without leaving its scope. The scope of this disclosure is limited only by the attached claims.

The term "one embodiment", "one embodiment" or "one or more embodiments" herein means that the features, structures, or features described in combination with embodiments are included in at least one embodiment disclosed herein. Also, note that the examples of words "in an embodiment" here do not necessarily all refer to the same embodiment.

A great deal of detail is provided in the instructions provided here. However, it is understood that this disclosed embodiment can be practiced without such specific details. In some instances, known methods, structures and techniques are not detailed so as not to obscure the understanding of this specification.

In a claim, no reference symbol between parentheses shall be constructed to limit the claim. The word "include" does not exclude the existence of elements or steps not listed in the claim. The word "one" or "one" before a component does not preclude the existence of more than one such component. This exposure can be implemented with the help of hardware including several different components and with the help of properly programmed computers. In listing the unit claims of several devices, several of these devices can be embodied by the same hardware item. The use of the words first, second, and third does not indicate any order. These words can be interpreted as names.

Finally, it should be noted that: the above embodiments are only used to illustrate the disclosed technical solution, but not to limit it; Notwithstanding the detailed description of this disclosure with reference to the foregoing embodiments, ordinary technical personnel in the field should understand that they can still modify the technical solutions recorded in the foregoing embodiments, or make equivalent substitutions to some of the technical features thereof; Such modifications or substitutions shall not separate the essence of the corresponding technical solutions from the spirit and scope of the technical solutions of the disclosed embodiments.

The invention claimed is:

1. An image processing method, wherein the method comprises:
   acquiring an original image;
   performing a fuzzy processing to the original image to obtain a fuzzy image;
   generating a first characteristic matrix by performing a high-dynamic-range processing to the original image using a first network model obtained by pre-training, wherein the first network model comprises a dense residual module and a gate-control-channel conversion module, the dense residual module comprises a dense-connection network and a residual network, an input of the residual network comprises output results of a plurality of convolutional layers in the dense-connection network; the gate-control-channel conversion module is configured to analyze differences between a plurality of input characteristic channels, and determine a weight of each of the characteristic channels according to analysis results;
   obtaining an auxiliary characteristic matrix of the original image according to the fuzzy image, wherein the auxiliary characteristic matrix comprises at least one of the following information: detail information of the original image and low-frequency information of the original image; and
   obtaining a target image according to the first characteristic matrix and the auxiliary characteristic matrix.

2. The image processing method according to claim 1, wherein the first network model comprises the plurality of dense residual modules and gate-control-channel conversion modules which are alternately disposed.

3. The image processing method according to claim 1, wherein the auxiliary characteristic matrix comprises a second characteristic matrix and a third characteristic matrix, the step of obtaining the auxiliary characteristic matrix of the original image according to the fuzzy image comprises:
   according to the original image, the fuzzy image and a second network model obtained by pre-training, obtaining the second characteristic matrix, wherein the second characteristic matrix comprises the detail information of the original image, the second network model comprises the dense residual module and the gate-control-channel conversion module; and
   inputting the fuzzy image into a third network model obtained by pre-training, to obtain the third characteristic matrix, wherein the third characteristic matrix comprises the low-frequency information of the original image, the third network model comprises the dense residual module and the gate-control-channel conversion module.

4. The image processing method according to claim 3, wherein the step of according to the original image, the fuzzy image and the second network model obtained by pre-training, obtaining the second characteristic matrix, comprises:
   calculating a first difference value between the original image and the fuzzy image; and
   inputting the first difference value into the second network model, to obtain the second characteristic matrix.

5. The image processing method according to claim 3, wherein the step of obtaining a target image according to the first characteristic matrix and the auxiliary characteristic matrix, comprises:
   calculating a first sum value between the first characteristic matrix and the second characteristic matrix; and
   calculating a product between the first sum value and the third characteristic matrix, to obtain the target image.

6. The image processing method according to claim 3, wherein network structures of the first network model, the second network model and the third network model are same.

7. The image processing method according to claim 3, wherein before the steps of generating the first characteristic matrix, and obtaining the auxiliary characteristic matrix of the original image according to the fuzzy image, the method further comprises:
   obtaining an original sample image and a target sample image, wherein the original sample image is a low-dynamic-range image, and the target sample image is a high-dynamic-range image corresponding to the original sample image;
   performing the fuzzy processing to the original sample image, to obtain a fuzzy sample image;
   inputting the original sample image into a first to-be-trained network, to obtain a first output result;
   inputting a difference between the original sample image and the fuzzy sample image into a second to-be-trained network, to obtain a second output result;
   inputting the fuzzy sample image into a third to-be-trained network, to obtain a third output result;
   calculating a second sum value of the first output result and the second output result, and multiplying the second sum value to the third characteristic matrix, to obtain a predicted image; and
   according to the predicted image and the target sample image, training the first to-be-trained network, the second to-be-trained network and the third to-be-trained network, determining the first to-be-trained network as the first network model, determining the second to-be-trained network as the second network model, and determining the third to-be-trained network as the third network model.

8. The image processing method according to claim 7, wherein the step of according to the predicted image and the target sample image, training the first to-be-trained network, the second to-be-trained network and the third to-be-trained network, comprises:

calculating a second difference value between the predicted image and the target sample image;

calculating a first matching degree between the predicted image and a display screen, and a second matching degree between the target sample image and the display screen;

according to a difference between the first matching degree and the second matching degree, and the second difference value, calculating a loss function; and performing optimization to parameters in the first to-be-trained network, the second to-be-trained network and the third to-be-trained network with a target of minimizing the loss function, to obtain the first network model, the second network model and the third network model.

9. The image processing method according to claim 1, wherein the step of performing the fuzzy processing to the original image to obtain the fuzzy image, comprises:

performing a guided filter processing to the original image, to obtain the fuzzy image.

10. A non-transient computer-readable storage medium, when instructions in the non-transient computer-readable storage medium executed by a processor of an electronic device, causing the electronic device capable to execute the image processing method according to claim 1.

11. An electronic device, wherein the electronic device comprises:

a processor;

a memory for storing executable instructions of the processor;

wherein, the processor is configured for implementing the executable instructions, to implement the operations comprise:

acquiring an original image;

performing a fuzzy processing to the original image to obtain a fuzzy image;

generating a first characteristic matrix by performing a high-dynamic-range processing to the original image using a first network model obtained by pre-training, wherein the first network model comprises a dense residual module and a gate-control-channel conversion module, the dense residual module comprises a dense-connection network and a residual network, an input of the residual network comprises output results of a plurality of convolutional layers in the dense-connection network; the gate-control-channel conversion module is configured to analyze differences between a plurality of input characteristic channels, and determine a weight of each of the characteristic channels according to analysis results;

obtaining an auxiliary characteristic matrix of the original image according to the fuzzy image, wherein the auxiliary characteristic matrix comprises at least one of the following information: detail information of the original image and low-frequency information of the original image; and obtaining a target image according to the first characteristic matrix and the auxiliary characteristic matrix.

12. The electronic device according to claim 11, wherein the first network model comprises the plurality of dense residual modules and gate-control-channel conversion modules which are alternately disposed.

13. The electronic device according to claim 11, wherein the auxiliary characteristic matrix comprises a second characteristic matrix and a third characteristic matrix, the operation of obtaining the auxiliary characteristic matrix of the original image according to the fuzzy image comprises:

according to the original image, the fuzzy image and a second network model obtained by pre-training, obtaining the second characteristic matrix, wherein the second characteristic matrix comprises the detail information of the original image, the second network model comprises the dense residual module and the gate-control-channel conversion module; and inputting the fuzzy image into a third network model obtained by pre-training, to obtain the third characteristic matrix, wherein the third characteristic matrix comprises the low-frequency information of the original image, the third network model comprises the dense residual module and the gate-control-channel conversion module.

14. The electronic device according to claim 13, wherein the operation of according to the original image, the fuzzy image and the second network model obtained by pre-training, obtaining the second characteristic matrix, comprises:

calculating a first difference value between the original image and the fuzzy image; and inputting the first difference value into the second network model, to obtain the second characteristic matrix.

15. The electronic device according to claim 13, wherein the operation of obtaining a target image according to the first characteristic matrix and the auxiliary characteristic matrix, comprises:

calculating a first sum value between the first characteristic matrix and the second characteristic matrix; and calculating a product between the first sum value and the third characteristic matrix, to obtain the target image.

16. The electronic device according to claim 13, wherein network structures of the first network model, the second network model and the third network model are same.

17. The electronic device according to claim 13, wherein before the operations of generating the first characteristic matrix, and obtaining the auxiliary characteristic matrix of the original image according to the fuzzy image, the method further comprises:

obtaining an original sample image and a target sample image, wherein the original sample image is a low-dynamic-range image, and the target sample image is a high-dynamic-range image corresponding to the original sample image;

performing the fuzzy processing to the original sample image, to obtain a fuzzy sample image;

inputting the original sample image into a first to-be-trained network, to obtain a first output result;

inputting a difference between the original sample image and the fuzzy sample image into a second to-be-trained network, to obtain a second output result;

inputting the fuzzy sample image into a third to-be-trained network, to obtain a third output result;

calculating a second sum value of the first output result and the second output result, and multiplying the second sum value to the third characteristic matrix, to obtain a predicted image; and according to the predicted image and the target sample image, training the first to-be-trained network, the second to-be-trained network and the third to-be-trained network, determining the first to-be-trained network as the first network model, determining the second to-be-trained network as the second network model, and determining the third to-be-trained network as the third network model.

18. The electronic device according to claim 17, wherein the operation of according to the predicted image and the target sample image, training the first to-be-trained network, the second to-be-trained network and the third to-be-trained network, comprises:

calculating a second difference value between the predicted image and the target sample image;

calculating a first matching degree between the predicted image and a display screen, and a second matching degree between the target sample image and the display screen;

according to a difference between the first matching degree and the second matching degree, and the second difference value, calculating a loss function; and     performing optimization to parameters in the first to-be-trained network, the second to-be-trained network and the third to-be-trained network with a target of minimizing the loss function, to obtain the first network model, the second network model and the third network model.

19. The electronic device according to claim 11, wherein the operation of performing the fuzzy processing to the original image to obtain the fuzzy image, comprises:

performing a guided filter processing to the original image, to obtain the fuzzy image.

\* \* \* \* \*